United States Patent [19]

Iio

[11] 4,285,311
[45] Aug. 25, 1981

[54] TWO STROKE ENGINE HAVING EXHAUST PORT TIMING CONTROL VALVE

[75] Inventor: Toshimitsu Iio, Hamamatsu, Japan

[73] Assignee: Yamaha Hatsudoki Kabushiki Kaisha, Shizuoka, Japan

[21] Appl. No.: 61,514

[22] Filed: Jul. 27, 1979

[30] Foreign Application Priority Data

Jul. 31, 1978 [JP] Japan ............... 53/105173[U]

[51] Int. Cl.³ ............... F02D 9/06
[52] U.S. Cl. ............... 123/323; 123/73 V; 123/73 SP; 123/73 R; 188/273
[58] Field of Search ............... 123/107, 108, 65 R, 123/65 A, 65 PE, 65 FM, 65 V, 65 P, 65 PP, 73 R, 73 SP, 323, 339; 60/314, 602, 603; 188/273

[56] References Cited

U.S. PATENT DOCUMENTS

| 2,292,805 | 8/1942 | Tippen | 123/108 |
| 2,714,879 | 8/1955 | Meulien | 123/107 |
| 4,121,552 | 10/1978 | Mithoo | 123/65 PE |

*Primary Examiner*—Wendell E. Burns
*Attorney, Agent, or Firm*—Kerkam, Stowell, Kondracki & Clarke

[57] ABSTRACT

Two stroke engine having an exhaust port provided with a rotary type timing control valve at the upper portion thereof. The control valve is connected with a centrifugal actuator which is responsive to the engine speed so that the exhaust port is wide open under a high speed engine operation but covered at the upper portion by said control valve under a low speed operation to change the exhaust port timing.

5 Claims, 4 Drawing Figures

TWO STROKE ENGINE HAVING EXHAUST PORT TIMING CONTROL VALVE

The present invention relates to two stroke engines and more particularly to two stroke engines having rotary valves for controlling exhaust port timings in accordance with engine speed.

Conventional two stroke engines generally include an exhaust port provided in the cylinder wall so that it is controlled by the piston as the piston reciprocates in the cylinder. It has been recognized that the exhaust port timing has an important effect on the engine performance and that the optimum exhaust timing is dependent on the engine speed. In order to provide an improved engine performance, the exhaust port timing must be advanced under a high engine speed than that under a low engine speed.

In order to meet the aforementioned requirement, there has already been proposed, by Japanese Utility Model Application Sho No. 49-111838 corresponding to the United States Patent Application Ser. No. 781,429 which is a continuation of Ser. No. 612,863 and matured into U.S. Pat. No. 4,121,552, to provide a rotary valve member at the upper portion of the exhaust port. The valve member has a part-circular cross-sectional configuration and rotatable between a retracted position wherein the valve member is retracted from the exhaust port and a projected position wherein the valve member projects into the exhaust port to thereby cover the upper portion of the exhaust port so that the exhaust port timing is changed.

It is an object of the present invention to provide means for actuating such exhaust port timing controlling rotary valve in accordance with the engine speed.

Another object of the present invention is to provide exhaust port timing control means which is reliable in operation and can withstand the heat to which the control means is subjected in operation.

A further object of the present invention is to provide exhaust port timing control means which is particularly suitable for motorcycle engines.

According to the present invention, the above and other objects can be accomplished by a two stroke engine comprising cylinder means and piston means which is received in said cylinder means for reciprocating movement, said cylinder means having exhaust port means adapted to be closed by said piston means, exhaust port timing control rotary valve means provided in said exhaust port means at upper portion thereof, said valve means being movable between a projected position wherein it is projected into the exhaust port means to thereby cover the upper portion of the exhaust port means and a retracted position wherein it is retracted from the exhaust port means, actuator means for moving said valve means between said projected and retracted positions in accordance with engine speed, said actuator means including centrifugal means responsive to said engine speed and connected with said valve means so that said valve means is moved toward the projected position in response to a decrease in the engine speed. The centrifugal means may be connected with the valve means through an actuating arm which is secured to the valve means at one end thereof. When the present invention is applied to a motorcycle engine, the exhaust port means is located at the front side of the engine as conventional in the art and the actuating arm may preferably be positioned so as to extend rearwardly from the valve means. With this arrangement, the actuating arm can be adequately cooled by air and nevertheless the position of the actuating arm can be stabilized even when it is subjected to an air stream when the motorcycle is operated.

The centrifugal means may comprise a disc adapted to be driven by the engine and having one surface formed with at least one radial groove, a conical member having a conical surface opposed to said one surface of the disc and connected with said disc with a freedom of axial movement with respect thereto, spring bias means for urging said conical member toward the disc, at least one centrifugal ball provided between said disc and said conical member and received in said radial groove. The conical member may be connected with said actuating arm on the rotary valve means.

The arrangement of the present invention is advantageous over conventional arrangements wherein electrically operated actuating means is used in that the structure is simple and a reliable operation is ensured for a prolonged time.

The above and other objects and features of the present invention will become apparent from the following descriptions of a preferred embodiment taking reference to the accompanying drawings, in which.

Figure 1:
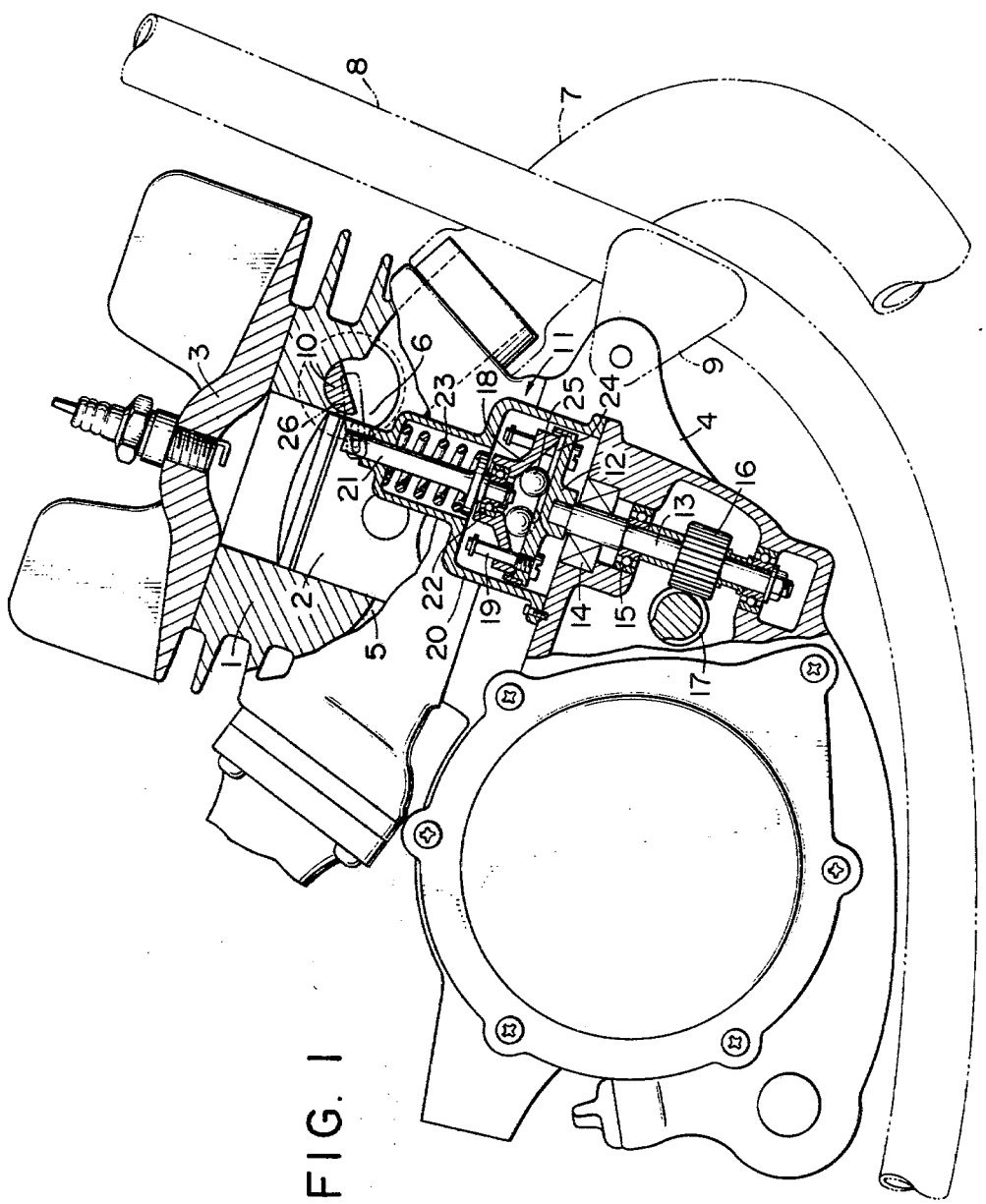
FIG. 1 is a partially cut-away side view of a two stroke motorcycle engine embodying the features of the present invention.

Referring now to the drawings, particularly to FIG. 1, there is shown a crankcase precompression type two stroke engine comprising a cylinder 1 and a piston 2 which reciprocates in the cylinder 1. A cylincer head 3 is secured to the top end of the cylinder 1 and a crankcase 4 is secured to the lower end of the cylinder 1. The cylinder 1 is formed with an intake port 5 which leads to the crankchamber (not shown) defined in the crankcase 4. Further, the cylinder 1 is formed with an exhaust port 6 which is connected with an exhaust pipe 7. The engine is mounted on a motorcycle frame 8 by means of brackets 9. As usual in motorcycles, the exhaust port 6 is located at the front side of the cylinder 1.

Figure 2:
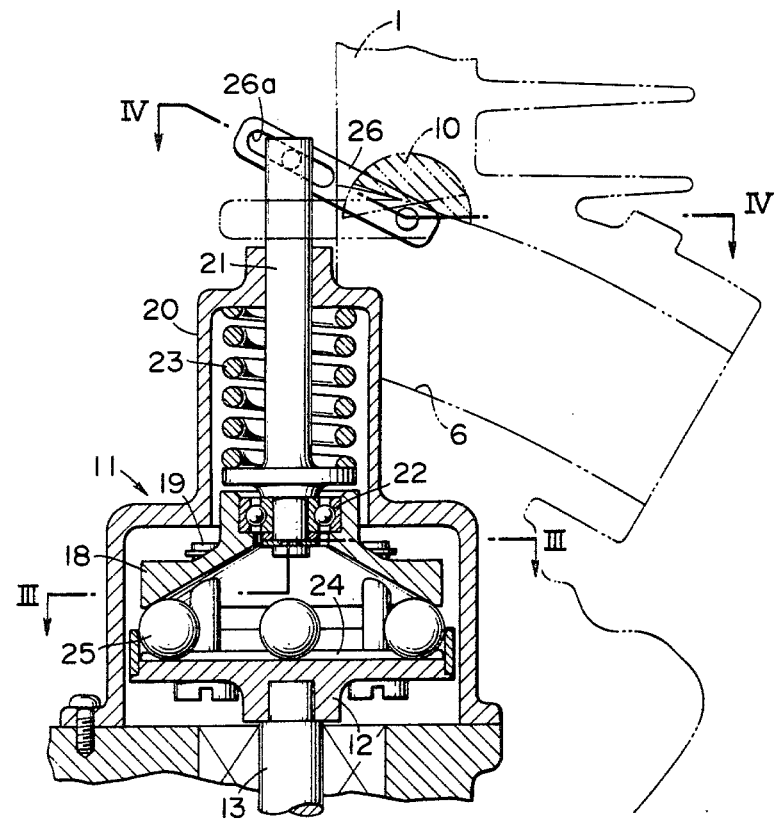
FIG. 2 is an enlarged sectional view of the centrifugal actuating device.
Figure 3:
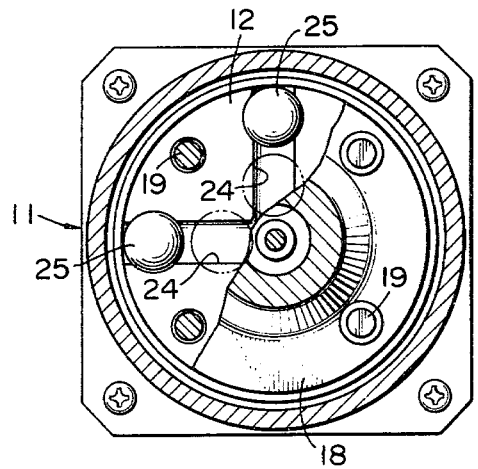
FIG. 3 is a sectional view taken substantially long the line III—III in FIG. 2.

At the upper portion of the exhaust port 6, there is provided a rotary valve member 10 having a part-circular cross-sectional configuration. The valve member is arranged in a recess of a part-circular cross-sectional configuration formed in the cylinder 1 and extends with its longitudinal axis transverse to the axis of the cylinder 1. The valve member 10 is rotatable about its longitudinal axis between a retracted position in which the valve member 10 is retracted in the recess of the cylinder 1 as shown by solid lines in FIG. 2 and a projected position in which it is projected into the exhaust port 6 to cover the upper portion of the exhaust port 6. It should thus be noted that, in the projected position of the valve member 10, the exhaust port timing is retarded as compared with that in the retracted position.

According to the features of the present invention, a centrifugal actuator 11 is provided in order to actuate the valve member in accordance with the engine speed. In the illustrated embodiment, the actuator 11 comprises a rotatable disc 12 which has a driving shaft 13 mounted on the crankcase 4 through bearings 14 and 15.

On the driving shaft 13, there is formed a pinion 16 which is in meshing engagement with a gear 17 formed on a counter shaft driven by the engine crankshaft (not shown). A conical member 18 is provided opposite to the disc 12 and connected therewith through guide rods 19 in such a manner that the conical member 18 is rotated with but axially movable with respect to the disc 12. The disc 12 and the conical member 18 are housed in a casing 20 which is secured to the crankcase 4 and an actuating rod 21 is disposed so as to extend through the casing 20. The rod 21 is connected at one end with the conical member 28 through a bearing 22 and the other of the rod 21 extends outwardly through the casing 20. A spring 23 is provided between the casing 20 and the rod 21 so as to force the conical member 18 toward the disc 12.

The rotatable disc 12 is formed at the side facing to the conical member 18 with radially extending grooves 24 which receive centrifugal balls 25 so that they act between the disc 12 and the conical member 18. It should be understood that in response to an increase in the rotating speed of the shaft 13, the balls 25 are forced radially outwards under the centrifugal force to thereby force the conical member 18 away from the disc 12.

Figure 4:
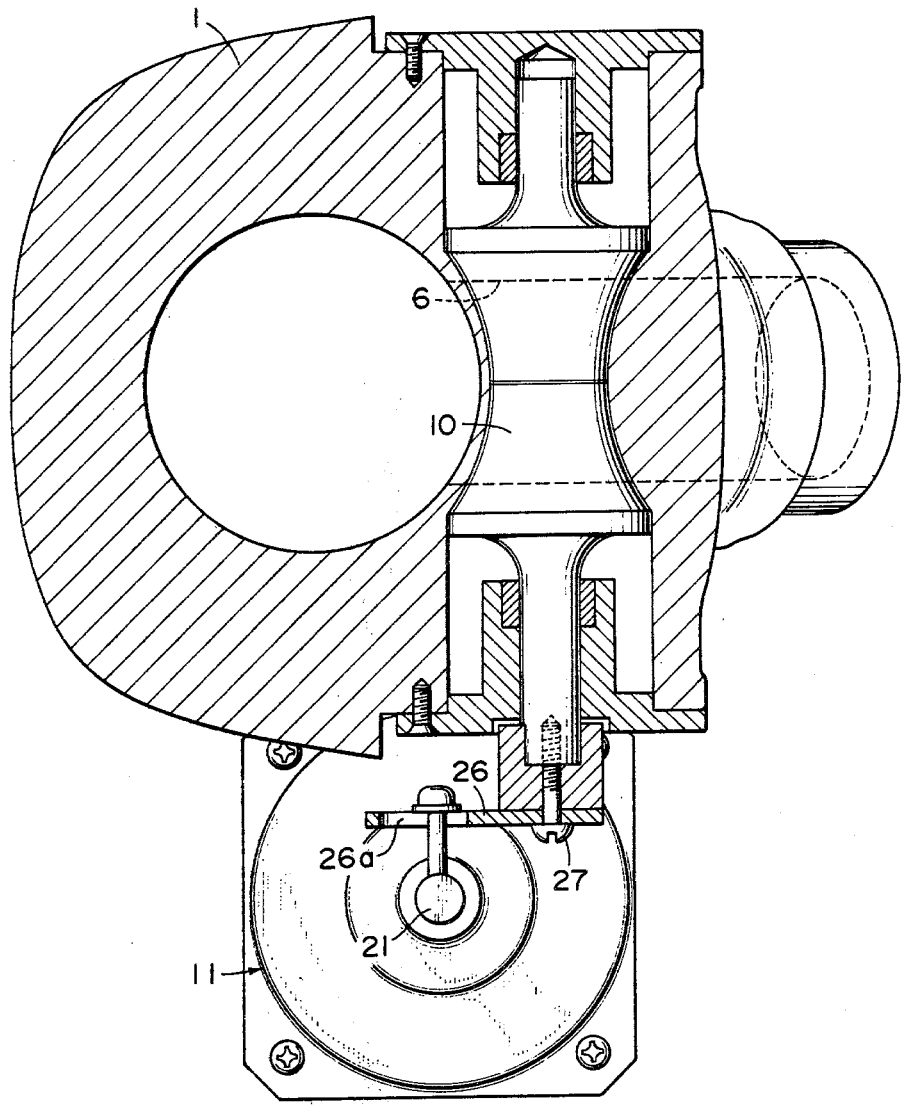
FIG. 4 is a sectional view taken substantially along the line IV—IV in FIG. 2.

As clearly shown in FIG. 4, the valve member 10 is provided at one end with an actuating arm 26 which is secured thereto by means of a screw 27. The arm 26 extends in the rearward direction of the motorcycle as shown in FIG. 1 and connected with the outer end of the actuating rod 21 through a slot 26a formed in the arm 26. Accordingly, under a high engine speed, the actuating rod 21 is forced outwardly under the centrifugal action of the balls 25 against the action of the spring 23 to rotate the actuating arm 26 clockwise so that the valve member 10 is moved to the retracted position. Therefore, the exhaust port closing time is retarded and the opening time is advanced to provide an optimum exhaust port timing for a high speed operation. Under a low engine speed, the conical member 18 is forced under the influence of the spring 23 toward the disc 12 so that the acutating arm 26 is rotated counterclockwise to thereby move the valve member 10 to the projected position. Thus, the exhaust port closing timing is advanced and the opening timing is retarded.

The arrangement of the present invention is particularly suitable for a motorcycle which is designed for an off-road racing. The engine can withstand both the low speed, high torque operation and the high speed, high output operation. The centrifugal type valve actuator is comparatively simple in structure and reliable with minimum troubles. Further, the actuator can be used even in a motorcycle having no battery since the actuator does not require any electric power. In the illustrated embodiment, the valve actuating mechanism including the actuating arm 26 and the actuator 11 can be adequately cooled by air so that there is no risk that the operation of the valve actuating mechanism is disturbed by the heat of exhaust gas. Further, since the actuating arm 26 is extending rearwardly, there is least possibility that the actuating arm 26 is fluctuated under the wind pressure when the motorcycle is in operation.

The invention has thus been shown and described with reference to a specific embodiment, however, it should be noted that the invention is in no way limited to the details of the illustrated arrangements but changes and modifications may be made without departing from the scope of the appended claims.

I claim:

1. A two stroke engine comprising cylinder means and piston means received in said cylinder means for reciprocating movement, said cylinder means having exhaust port means adapted to be closed by said piston means, exhaust port timing control rotary valve means provided in said exhaust port means at an upper portion thereof, said valve means being movable between a projected position wherein it is projected into said exhaust port means to thereby cover an upper portion of said exhaust port means and a retracted position wherein it is retracted from said exhaust port means, actuator means for moving said valve means between said projected and retracted positions in accordance with engine speed, said actuator means including actuating rod means connected between said valve means and centrifugal means responsive to said engine speed and spring means forcing said valve means toward the projected position so that said valve means is moved toward the retracted position in response to an increase in engine speed, said valve means being located with a longitudinal axis perpendicular to a longitudinal axis of said cylinder means and actuating arm means secured to one end thereof, said actuating arm means extending from said valve means substantially perpendicular to the axis of the valve means toward said cylinder means and being connected with said actuating rod means so that said valve means is actuated under the influence of said centrifugal means, said actuating rod means extending substantially parallel with a longitudinal axis of said cylinder means so that said actuator means is located in a minimum space.

2. A two stroke engine comprising cylinder means and piston means mounted in said cylinder means for reciprocating movement, said cylinder means having exhaust port means adapted to be closed by said piston means, said enginge being mounted on a motorcycle with said exhaust port means positioned at a front side, exhaust port means positioned at a front side, exhaust port timing control rotary valve means provided in said exhaust port means at an upper portion thereof, said valve means being movable between a projected position wherein it is projected into said exhaust port means to thereby cover an upper portion of said exhaust port means and a retracted position wherein said valve means is retracted from said exhaust port means, said valve means being located with a longitudinal axis perpendicular to a longitudinal axis of said cylinder means and actuating arm means extending from said valve means substantially perpendicularly to said axis of the valve means toward said cylinder means, actuator means for moving said valve means between said projected and retracted positions in accordance with engine speed, said actuator means including centrifugal means responsive to said engine speed, said centrifugal means comprising a disc driven by the engine and having one surface formed with at least one radial groove, a conical member having a conical surface opposed to said one surface of said disc and connected to said disc with a freedom of axial movement with respect thereto, spring bias means for urging said conical member toward said disc, at least one centrifugal ball between said disc and said conical member and received in said radial groove, actuating arm means secured to one end and extending rearwardly from said valve means, said actuating arm means being connected to said conical member of said centrifugal means by actuating rod means extending substantially parallel to a longitudinal axis of said cylinder means.

3. Two stroke engine in accordance with claim 1 which is mounted on a motorcycle with the exhaust port means positioned at front side, said actuating arm means extending rearwardly from the valve means.

4. Two stroke engine in accordance with claim 1 in which said centrifugal means comprises a disc adapted to be driven by the engine and having one surface formed with at least one radial groove, a conical member having a conical surface opposed to said one surface of the disc and connected with said disc with a freedom of axial movement with respect thereto, spring bias means for urging said conical member toward the disc, at least one centrifugal ball provided between said disc and said conical member and received in said radial groove.

5. Two stroke engine in accordance with claim 4 in which said valve means has actuating arm means which is secured to one end thereof, said actuating arm means being connected with the conical member of the centrifugal means.

* * * * *